(12) United States Patent
Chen (10) Patent No.: US 8,111,735 B2
(45) Date of Patent: Feb. 7, 2012

(54) GNSS DATA/PILOT CORRELATOR AND CODE GENERATOR THEREOF

(75) Inventor: Kun-tso Chen, Chang-Hua Hsien (TW)

(73) Assignee: Mediatek Inc., Hsin-Chu (TW)

( * ) Notice: Subject to any disclaimer, the term of this patent is extended or adjusted under 35 U.S.C. 154(b) by 925 days.

(21) Appl. No.: 12/020,710

(22) Filed: Jan. 28, 2008

(65) Prior Publication Data
US 2009/0189808 A1   Jul. 30, 2009

(51) Int. Cl.
*H04B 1/00*   (2006.01)
(52) U.S. Cl. ........................................... 375/150
(58) Field of Classification Search ............... 375/141, 375/140, 147, 150; 341/173–183
See application file for complete search history.

(56) References Cited

U.S. PATENT DOCUMENTS

| | | | |
|---|---|---|---|
| 6,430,213 B1 | 8/2002 | Dafesh | |
| 6,741,633 B1 | 5/2004 | Cangiani et al. | |
| 6,922,167 B2 * | 7/2005 | Gerein | 342/357.74 |
| 7,120,198 B1 | 10/2006 | Dafesh et al. | |
| 7,139,302 B2 | 11/2006 | Raghavan et al. | |
| 2002/0169578 A1 * | 11/2002 | Yang | 702/152 |
| 2004/0071200 A1 * | 4/2004 | Betz et al. | 375/152 |
| 2004/0095989 A1 | 5/2004 | Raghavan et al. | |
| 2004/0161019 A1 * | 8/2004 | Raghavan et al. | 375/141 |
| 2004/0240581 A1 * | 12/2004 | Salapski | 375/295 |
| 2005/0012664 A1 * | 1/2005 | Gerein | 342/361 |
| 2005/0169409 A1 | 8/2005 | Coatantiec et al. | |
| 2005/0185700 A1 * | 8/2005 | Pietila et al. | 375/147 |
| 2005/0270997 A1 | 12/2005 | Julien et al. | |
| 2005/0281325 A1 | 12/2005 | Lillo et al. | |
| 2006/0038716 A1 | 2/2006 | Lestarquit | |
| 2006/0097915 A1 | 5/2006 | Martin et al. | |
| 2006/0128343 A1 | 6/2006 | Leblond et al. | |
| 2006/0212179 A1 | 9/2006 | Philips et al. | |
| 2006/0273953 A1 | 12/2006 | Watson et al. | |
| 2006/0285581 A1 | 12/2006 | Mattos | |
| 2006/0291538 A1 | 12/2006 | Cangiani et al. | |
| 2007/0268180 A1 * | 11/2007 | Zhi et al. | 342/357.12 |
| 2007/0274374 A1 * | 11/2007 | Abraham | 375/148 |
| 2008/0084954 A1 * | 4/2008 | Chen et al. | 375/354 |
| 2009/0124204 A1 * | 5/2009 | Howard et al. | 455/59 |

OTHER PUBLICATIONS

Simsky et al, Galileo Receiver Development at Septentro, ENC GNSS 2005, Munich, Germany, Jul. 19-22, 2005).*

* cited by examiner

*Primary Examiner* — Jaison Joseph
(74) *Attorney, Agent, or Firm* — Kirton & McConkie; Evan R. Witt (57) ABSTRACT

A correlator for a GNSS receiver and a code generator used in the correlator as well as a correlation method are disclosed. In the GNSS, each satellite transmits a data signal and a pilot signal. The correlator is adaptable for executing correlation to the data signal, the pilot signal and various combinations thereof, such as non-coherent and coherent combinations. The code generator generates primary ranging codes of the data and pilot signals as well as various combinations thereof, such as sum or difference of the primary ranging codes of the data and pilot signals. By using the various codes, the correlator is adaptable and flexible for different correlation requirements.

24 Claims, 11 Drawing Sheets

GNSS DATA/PILOT CORRELATOR AND CODE GENERATOR THEREOF

TECHNICAL FIELD OF THE INVENTION

The present invention relates to a GNSS (Global Navigation Satellite System) receiver, more particularly, to a correlator of the GNSS receiver which is capable of processing data signal and pilot signal, and a code generator used in the correlator.

BACKGROUND OF THE INVENTION

To raise satellite acquisition and tracking performance, it is a main trend that most of the modernized GNSS will utilize a pilot signal as aid. That is, in addition to a data signal carrying navigation message, each satellite in the GNSS further transmits a pilot signal. Such modernized GNSS include new generation GPS (Global Positioning System) (L1C, L2C, L5 bands), Galileo (L1F (also referred to as E1), E5ab, E6C bands) and Compass Satellite System.

Taking Galileo L1F as an example, each satellite transmits two kinds of signals, data signal and pilot signal. As mentioned, the data signal carries navigation message. In contrast, the pilot signal is "dateless." Both of the data signal and pilot signal are respectively modulated with different ranging code, that is, different PRN codes. In addition to PRN code, which is also referred to as a primary ranging code, the pilot signal is further modulated with a known secondary code. The data signal is modulated by 250 sps (symbol per second) data symbols. That is, the primary ranging code period is 4 ms. A data symbol is transmitted every 4 ms. The data symbol is usually unknown. The pilot signal also has the same primary ranging code period of 4 ms. The secondary code is of 25 chips. The pilot secondary code sequence is known. Each secondary code chip is referred to a pilot symbol here. The secondary code period is 4×25=100 (ms). That is, the secondary code transits once per 100 ms. Since the pilot signal is known, the integration interval can be greatly extended to a very long period, such as several seconds, for example.

A modern GNSS receiver, which has a receiver processor for carrying out navigation by using correlation result from a correlator of the receiver, may need to acquire/track data and/or pilot signal under different circumstances. That is, the receiver processor may require correlation result of the data or pilot signal only, or combination of both, depending on the application condition. For example, the receiver is to acquire only the pilot signal of a satellite with the whole workload of the correlator at a cold start state. After the pilot signal is acquired, the obtained information such as Doppler frequency, code phase and the like can be used to despread and demodulate the data signal of the same satellite. If there is enough aiding information, it is preferable for the correlator to acquire/track the pilot and data signals to increase SNR (Signal to Noise Ratio) and thus improve the performance. As described above, the pilot signal is dateless. Therefore, great SNR and long coherent integration time can be obtained by using pilot signal. Tracking the pilot signal can be used to detect troubles such as multipath interference, jamming and so on. To get navigation message, it is necessary to track and decode the data signal. If the signal strength is weak, it is preferred that combination of the data and pilot signal correlation results are used to reduce the effect of noises. In addition to the above conditions, there can be still various conditions in which different selections are required.

As described, there are various conditions for the correlator of the receiver. If the pilot signal and data signal are separately processed by different correlators, either the correlator processing the data signal or the correlator processing the pilot signal may often be idle. It will be a waste of hardware. Accordingly, it is a need that data correlation and pilot correlation share the same hardware resource. To share the correlator between the data and pilot signals, it is an important task to allocate the correlator more flexibly and efficiently.

SUMMARY OF THE INVENTION

The present invention is to provide a correlator for a GNSS receiver. The correlator is adaptable for executing correlation to a data signal, a pilot signal from a satellite and various combinations of the data and pilot signals.

The present invention is further to provide a code generator, which is capable of generating primary ranging codes of the data and pilot signals as well as various combinations thereof.

In accordance with the present invention, the correlator comprises a Doppler frequency removal unit for removing Doppler frequency component of a received signal; a code generator controlled by symbols of the data signal and/or pilot signal to generate ranging codes for the data signal and pilot signal as well as combinations thereof; and an integration and dump unit for integrating and dumping the received signal being removed Doppler frequency and stripped off ranging code by using the ranging code output from the code generator to obtain correlation result thereof.

The code generator in accordance with the present invention comprises a data code generator for generating a ranging code for the data signal; a pilot code generator for generating a ranging code for the pilot signal; a first adder for generating a sum of the ranging codes for the data and pilot signals; and a second adder for generating a difference of the ranging codes for the data and pilot signal. The code generator may further comprise inverters to inverse the sum and difference of the ranging codes for the data and pilot signals. The code generator has a multiplexer for output selected on or more codes from the generated codes.

BRIEF DESCRIPTION OF THE DRAWINGS

The present invention will be described in detail in conjunction with the appending drawings, in which.

DETAILED DESCRIPTION OF THE INVENTION

For the same satellite, the data and pilot signals have several identical parameters such as Doppler frequency, carrier phase, code phase, code period, and subcarrier frequency/phase (for BOC (Binary Offset Carrier) modulated signal.) Accordingly, it is possible for the data and pilot signals to share the same hardware components or software routines in a receiver. As known, the different parameter between the pilot and data signals is the range code (PRN code for Galileo). To design a correlator which can be shared by the pilot and data signals, it is required that the correlator is capable of performing code despreading for both pilot and data signals. Furthermore, such a correlator must support coherent combination of the data and pilot signals. That is, after despreading, the data and pilot signals are combined in complex form (i.e. I and Q components) rather than the simple magnitude summation. The latter is referred to as non-coherent combination. The coherent combination of the pilot and data signals is preferred if possible, since such a combination provides better SNR. However, the coherent combination of the pilot and data signals is possible only if the data symbol phase is known.

Figure 1:
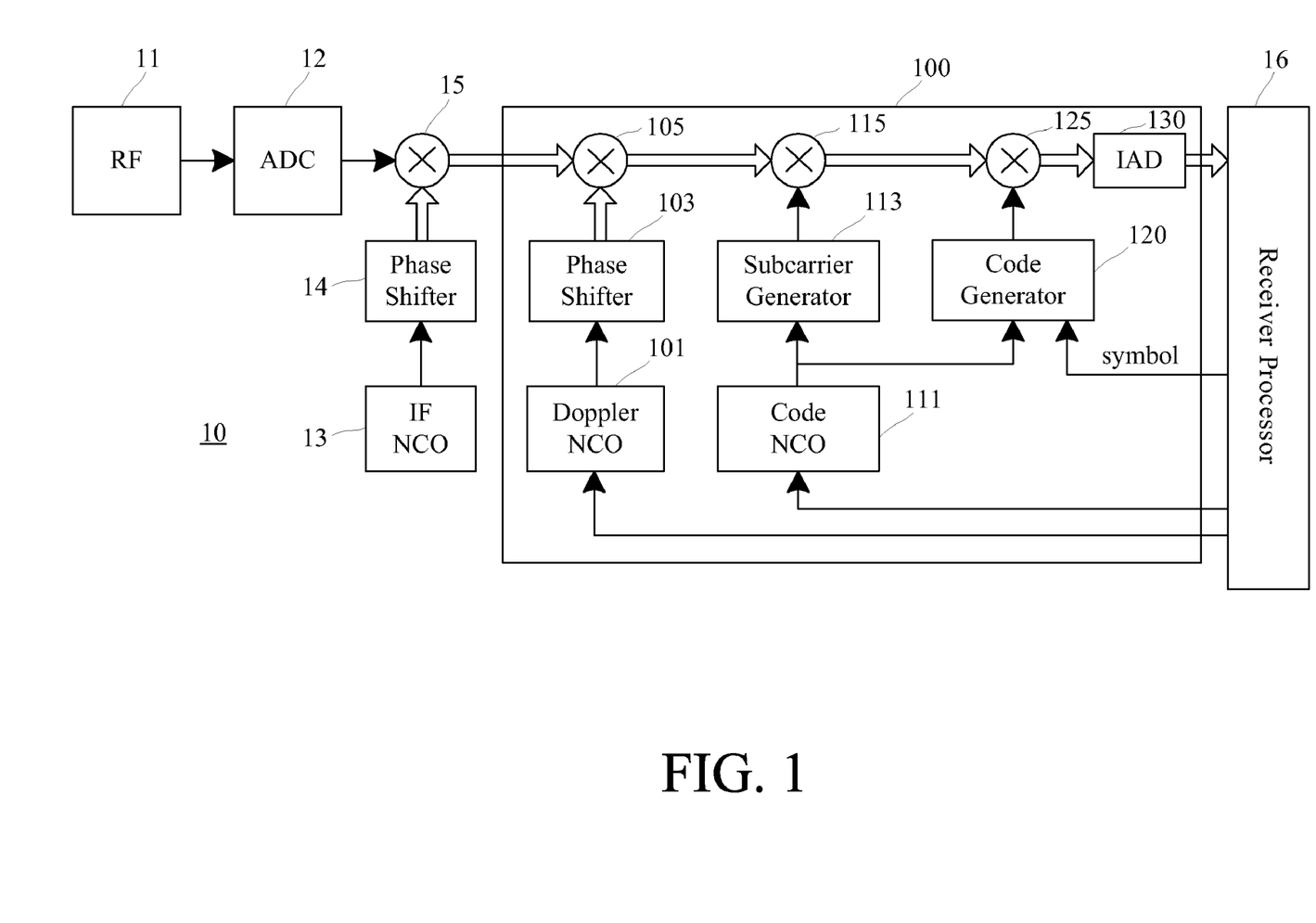
FIG. 1. is a block diagram schematically and generally showing a GNSS receiver having a correlator in accordance with a first embodiment of the present invention.

In the following descriptions, Galileo system E1 (or L1F) signal is taken as an example. FIG. 1 is a block diagram schematically and generally showing a GNSS receiver 10, which has a correlator 100 in accordance with a first embodiment of the present invention. Since the receiver 10 is used for Galileo system, in which BOC modulation is utilized, the correlator 100 is also required to deal with subcarrier of a received signal. The receiver 10 has an RF front end 11 for performing RF relevant operations as widely known in this field. An analog-to-digital converter (ADC) 12 converts the analog signal from the RF front end 11 into digital form. The receiver 10 includes an IF (intermediate frequency) NCO (numeral control oscillator) 13 for providing an IF carrier. The IF carrier is passed to a phase shifter 14 to be divided into I (in-phase) and Q (quadrature) components. The I and Q components of the IF carrier are mixed with the digital signal to remove the IF to convert the signal into a complex (I and Q) baseband signal. In the drawings, each black arrow indicates a mono signal, while each hollow white arrow indicates a complex signal (I, Q).

The receiver comprises the correlator 100 in accordance with the present invention. In the correlator 100, a Doppler NCO 101, a phase shifter 103 and a mixer 105 cooperate to remove the Doppler frequency of the incoming baseband signal. The Doppler NCO 101, phase shifter 103 and mixer 105 can be deemed as a Doppler frequency removal unit. A code NCO 111 provides a proper oscillation signal to a subcarrier generator 113 so that the subcarrier generator 113 generates a proper subcarrier and passes the same to a mixer 15 to remove subcarrier of the signal. Also, the code NCO 111, the subcarrier generator 113 and mixer 15 can be deemed as a subcarrier removal unit. It is noted that the subcarrier can be removed in any other suitable manner. For example, the subcarrier may also be removed before the signal enters the correlator 100.

The code NCO 111 also provides an oscillation signal to a code generator 120 so that the code generator 120 can generate a PRN code. That is, the code NCO 111 is shared by the subcarrier generator 113 and the code generator 120. It is possible since the code and subcarrier waveforms are in phase. In the present embodiment, data signal and pilot signal from a satellite share the same code generator 120. The code generator 120 can output the primary ranging code sequence corresponding to a satellite, which is assigned by a receiver processor 16. The generated PRN code is mixed with the signal by a mixer 125. Then the signal is integrated and dumped by the integration and dump unit (IAD) 130. Correlation result of the data or pilot signal from the IAD 130 is passed to the receiver processor 16 for application. It is noted that the Doppler NCO 101 and code NCO 111 are also controlled by the receiver processor 16. The code generator 120 can also use symbol information provided by a receiver processor 16 to remove the code phase transition on the primary code sequence due to data symbol or pilot symbol. In the present embodiment, the data symbol or pilot symbol is generated by a symbol generator (not shown) in the receiver processor 16. However, the symbol generator may also be included in the correlator 100. In an another embodiment, the code phase transition due to data or pilot symbol is corrected in the receiver processor 16, which can change the phase of output from IAD 130 according to the known data and/or pilot symbol.

Figure 2:
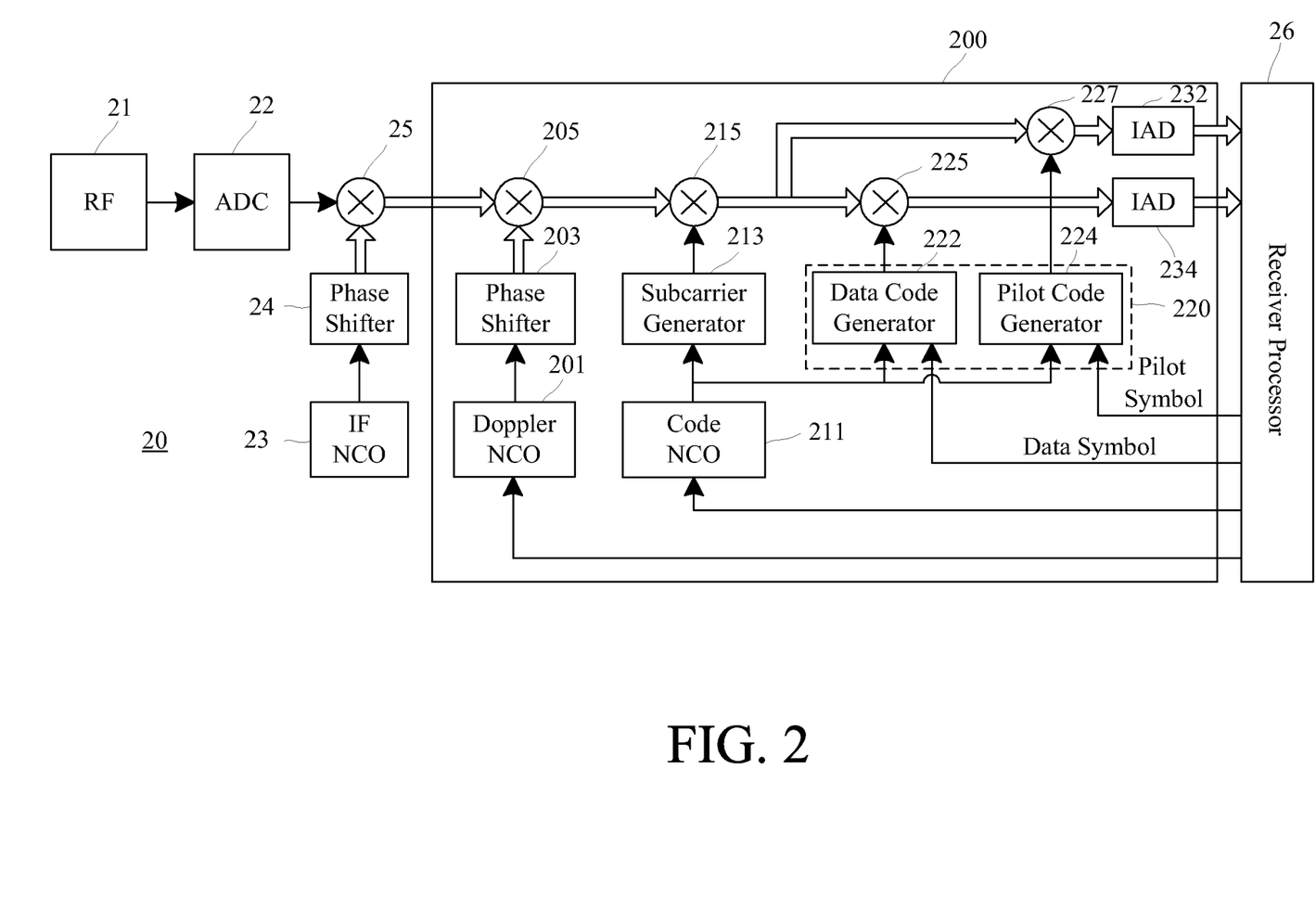
FIG. 2. is a block diagram schematically and generally showing a GNSS receiver having a correlator in accordance with a second embodiment of the present invention.

FIG. 2 is a block diagram schematically and generally showing a GNSS receiver 20, which has a correlator 200 in accordance with a second embodiment of the present invention. In this drawing, the similar reference numbers indicate the same elements as in FIG. 1, and therefore the descriptions thereof are omitted herein. As can be seen, the receiver 20 is similar to the receiver 10 in FIG. 1. The main difference is that a code generator 220 of the correlator 200 comprises two sub-blocks, a data code generator 222 and a pilot code generator 224. The data code generator 222 is controlled by a data symbol provided by the receiver processor 16 and generates a primary ranging code (e.g. PRN code) with data symbol phase transition corrected to despread the data signal through a mixer 225. The pilot code generator 224 is controlled by a pilot symbol provided by the receiver processor 26 and generates a primary ranging code (e.g. PRN code) with pilot symbol phase transition corrected to despread the pilot signal through a mixer 227. The data code generator 222 and pilot code generator 224 operate in parallel. That is, they can operate at the same time. The despreaded data and pilot signals are respectively integrated and dumped by IAD 232 and IAD 234. The correlation results of the data and pilot signals are passed to a receiver processor 26 to be processed.

Figure 3:
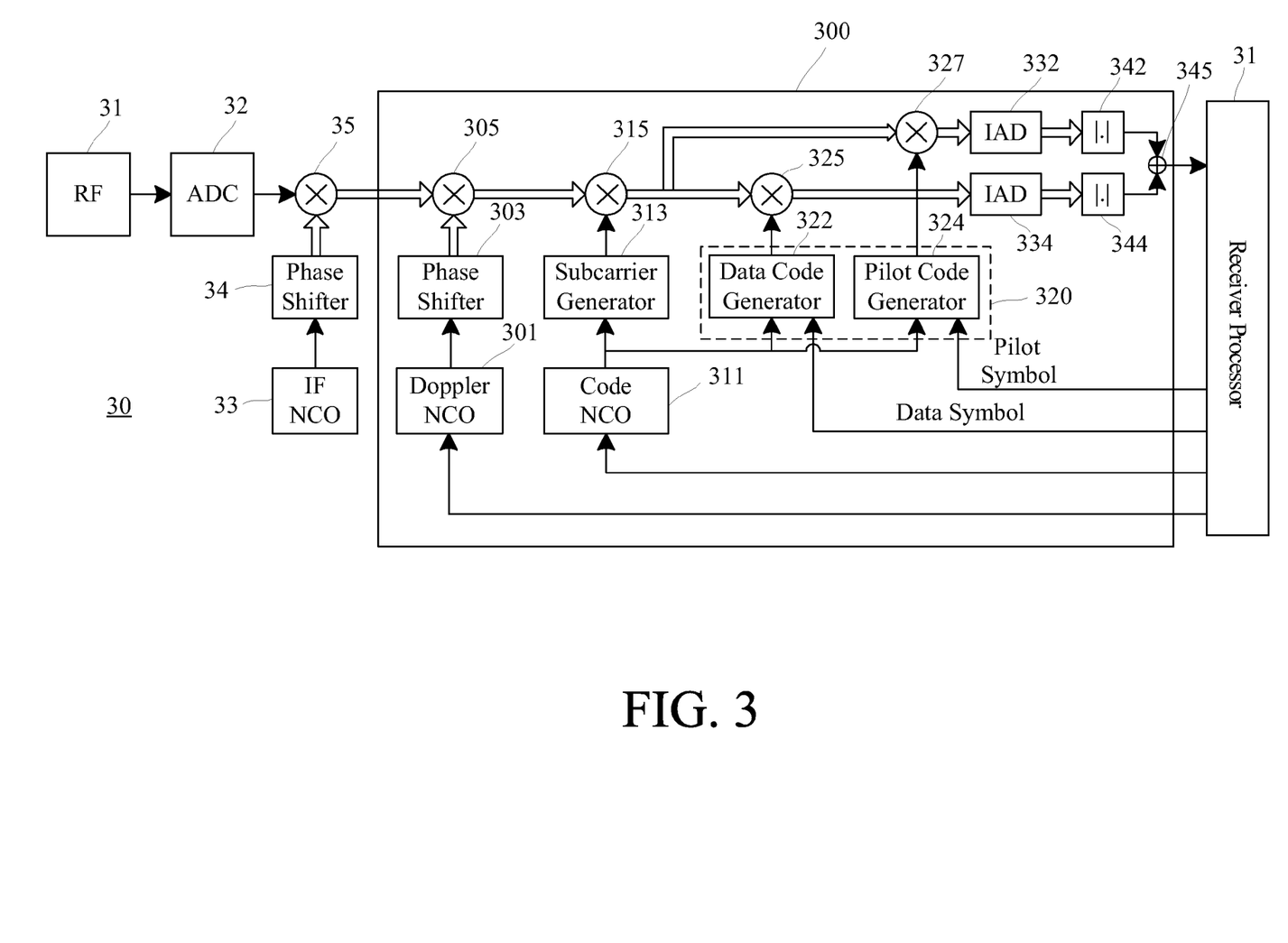
FIG. 3. is a block diagram schematically and generally showing a GNSS receiver having a correlator in accordance with a third embodiment of the present invention.

FIG. 3 is a block diagram schematically and generally showing a GNSS receiver 30, which has a correlator 300, in accordance with a third embodiment of the present invention. In this drawing, the similar reference numbers indicate the same elements as in FIG. 1, and therefore the descriptions thereof are omitted herein. As can be seen, the correlator 300 is similar to the correlator 200 in FIG. 2. The only difference is that the correlator 300 comprises two magnitude units 342 and 344 receiving the correlation results from IAD 332 and IAD 334 to calculate the magnitudes of the correlation results of the data signal and pilot signal, respectively. In addition, the correlator 300 further has an adder 345 for summing the magnitudes of the correlation results of the data signal and pilot signal. As previously described, this is so called "non-coherent combination" of the data and pilot signals. In is noted that the magnitude calculation and non-coherent combination can be implemented by means of hardware or software.

Figure 4:
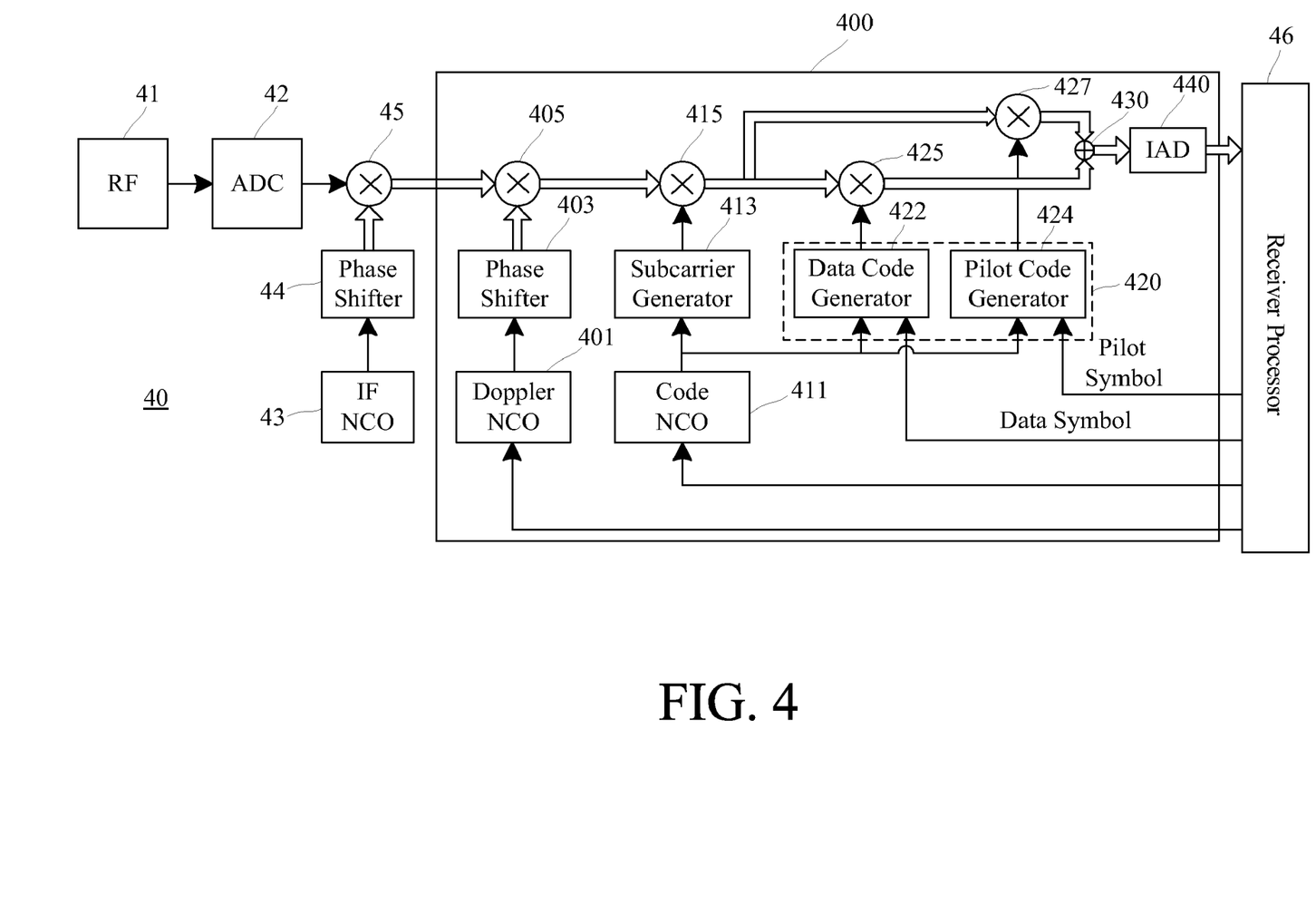
FIG. 4. is a block diagram schematically and generally showing a GNSS receiver having a correlator in accordance with a fourth embodiment of the present invention.

FIG. 4 is a block diagram schematically and generally showing a GNSS receiver 40, which has a correlator 400, in accordance with a fourth embodiment of the present invention. In this drawing, the similar reference numbers indicate the same elements as in FIG. 1, and therefore the descriptions thereof are omitted herein. As can be seen, the correlator 400 is similar to the correlator 300 in FIG. 3. Rather than combining magnitudes of the correlation results of the data and pilot signal, in the present embodiment, the data and pilot signals are combined in complex form by an adder 430. This is so called "coherent combination". After the data signal and pilot signal are combined into one combined signal, the combined signal is integrated and dumped by an IAD 440 to calculate the correlation result thereof. As mentioned, coherent combination of the data and pilot signals can increase SNR. If satellite transmission time is determined and the pilot signal symbol is known, then coherent combination can be utilized. Alternatively, if the data symbol is supplied by aiding source or autonomously predicted in advance, the coherent combination can also be used. If the data and pilot symbols are unknown, different combinations (e.g. noncoherent combination, coherent combination or the inverse of any) can be tried to find the greatest correlation result.

Figure 5:
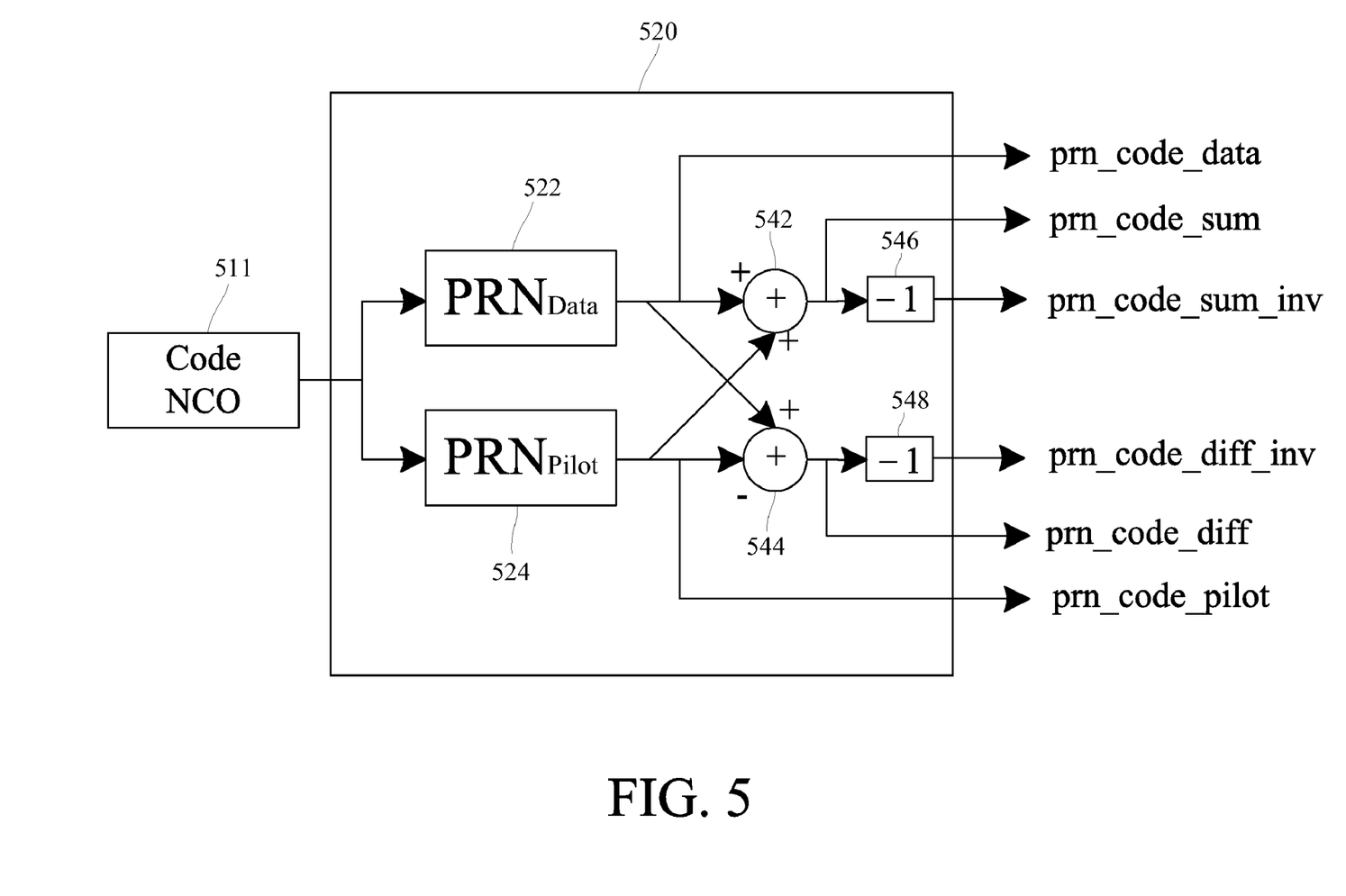
FIG. 5 schematically shows a code generator structure in accordance with the present invention.

To satisfy various conditions, the code generator in accordance with the present invention is designed to be able to provide various proper codes. FIG. 5 schematically shows a code generator 520 in accordance with the present invention. As shown in the drawing, the code generator 520 comprises a data code generator 522 and a pilot code generator 524, which use the signal from a code NCO 511 to respectively generate local replica signals used in code despreading. That is, the code generator 520 generates PRN codes for the data and pilot signals. It is noted that the data code generator 522 can generate the code with reference to a lookup table containing PRN codes used in the satellite system. The code generator 520 has two adders 542, 544 and two inverters 546, 548 so as to generate different combinations of the data PRN code and pilot PRN code. In addition to mere data ranging code and pilot ranging code prn_code_data and prn_code_pilot, these two codes can be added or subtracted mutually through the adder 542 or 544 to generate a sum code prn_code_sum (prn_code_data+prn_code_pilot) or difference code prn_code_diff (prn_code_data−prn_code_pilot). The former is used to the coherent combination of the data and pilot signals when the data symbol and pilot symbol are of the same sign; while the latter is used to the coherent combination of the data and pilot signals when the data symbol and pilot symbol are of opposite signs. Inverses of the sum and difference codes prn_code_sum_inv(−(prn_code_data+prn_code_pilot)) and prn_code_diff_inv(−(prn_code_data−prn_code_pilot)) are generated by passing the sum and difference codes through the inverters 546, 548, respectively. Other subset of the codes can be generated by modifying the code generator design. These different codes are output in parallel in this embodiment.

Figure 6:
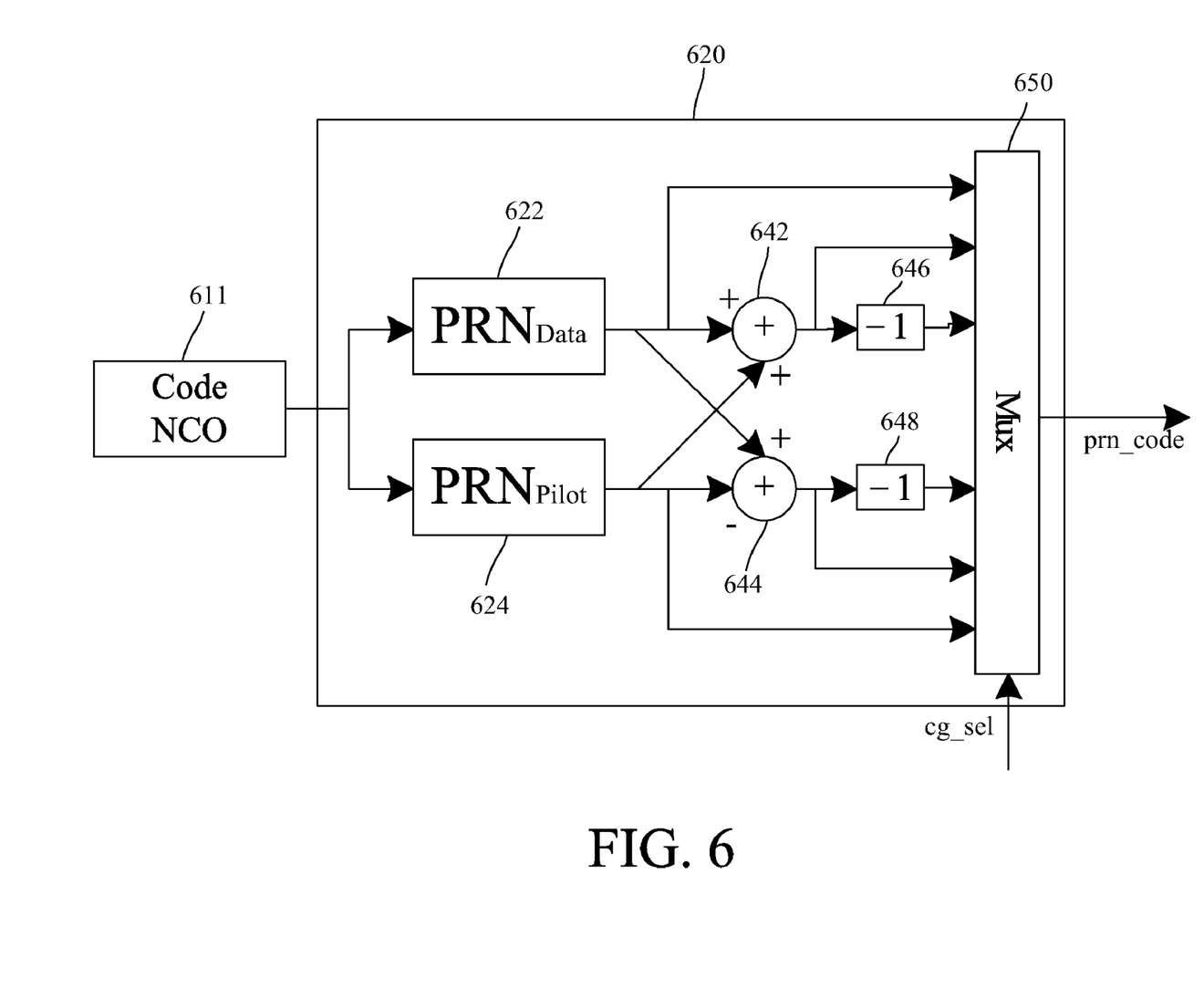
FIG. 6 schematically shows another code generator structure in accordance with the present invention.

FIG. 6 schematically shows another code generator 620 in accordance with the present invention. The code generator 620 is similar to the code generator 520 in FIG. 5 but further has a multiplexer 650 additionally. The six different codes as described above are fed to the multiplexer 650, and the multiplexer 650 outputs one of the codes each time depending on a control signal cg_sel from the receiver processor. The output code is indicated as prn_code in the drawing. That is, the different codes are output in a time division multiplexing (TDM) scheme.

Figure 7:
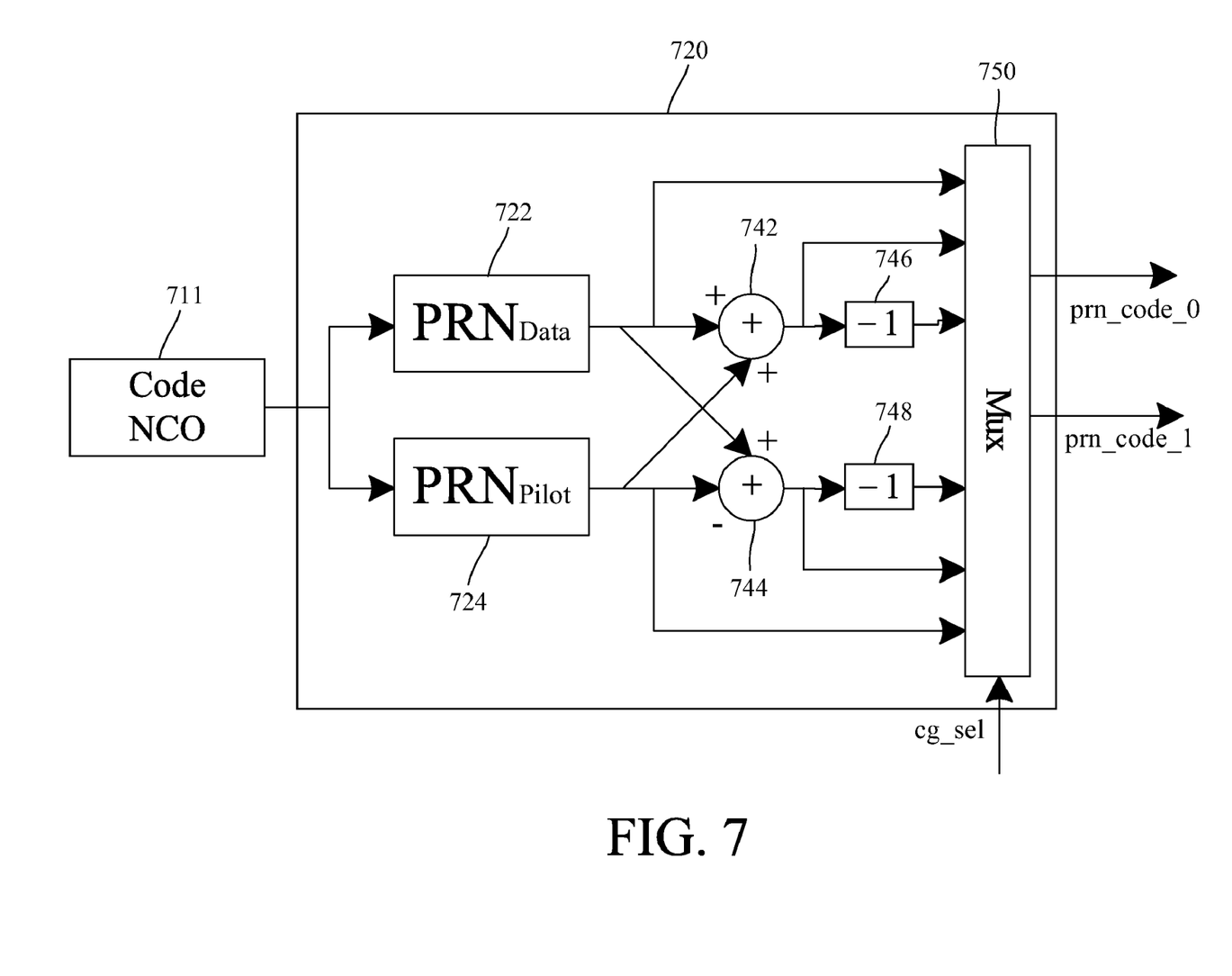
FIG. 7 schematically shows a further code generator structure in accordance with the present invention.

It is also possible that a plurality of selected codes are output at a time. FIG. 7 schematically shows still another code generator 720 in accordance with the present invention. The only difference between the code generator 720 and the code generator 620 of FIG. 6 is that a multiplexer 750 of the code generator 720 selects and outputs two codes (prn_code_0 and prn_code_1) each time under the control of the control signal cg_sel. It is noted that the like numbers in the FIGS. 5 to 7 indicate the same elements.

Figure 8:
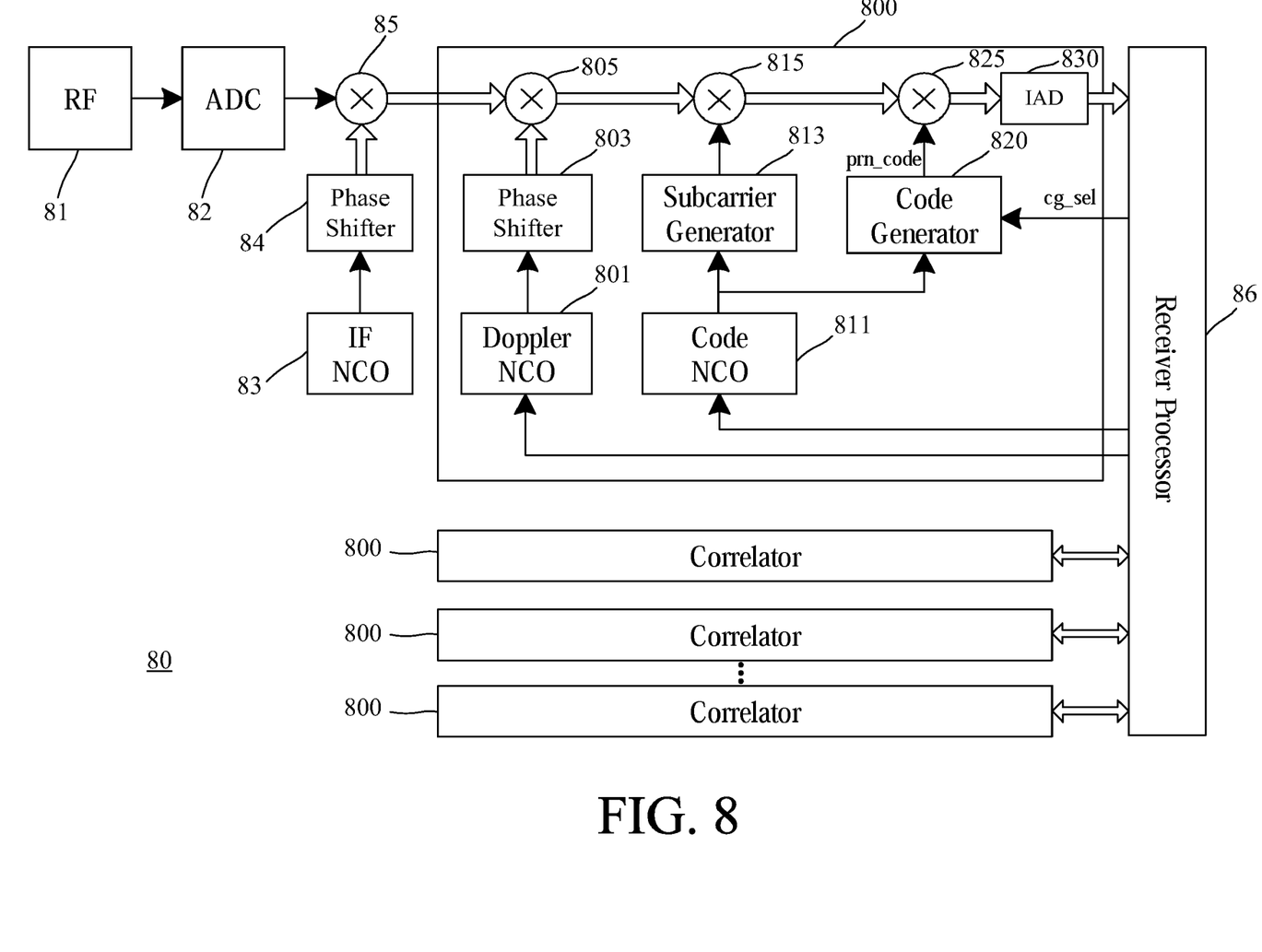
FIG. 8 is a block diagram schematically and generally showing a GNSS receiver having a correlator in accordance with a fifth embodiment of the present invention.

FIG. 8 is a block diagram schematically and generally showing a GNSS receiver 80 in accordance with a fifth embodiment of the present invention. As can be seen from this drawing, the structure of the receiver 80 is similar to the receiver 10 in FIG. 1. Again, the like reference numbers indicate the same elements. However, the receiver 80 comprises a plurality of correlators 800. Each correlator 800 is communicated with a receiver processor 86. Each correlator 800 has the same structure as the correlator 100 in FIG. 1. The correlator 800 has a code generator 820, which can be implemented by the code generator 620 in FIG. 6. The code generator 820 receives a control signal cg_sel from a receiver processor 86 and outputs a proper prn_code signal to a mixer 825 each time to execute correlation. The plurality of correlators 800 operate in parallel.

Figure 9:
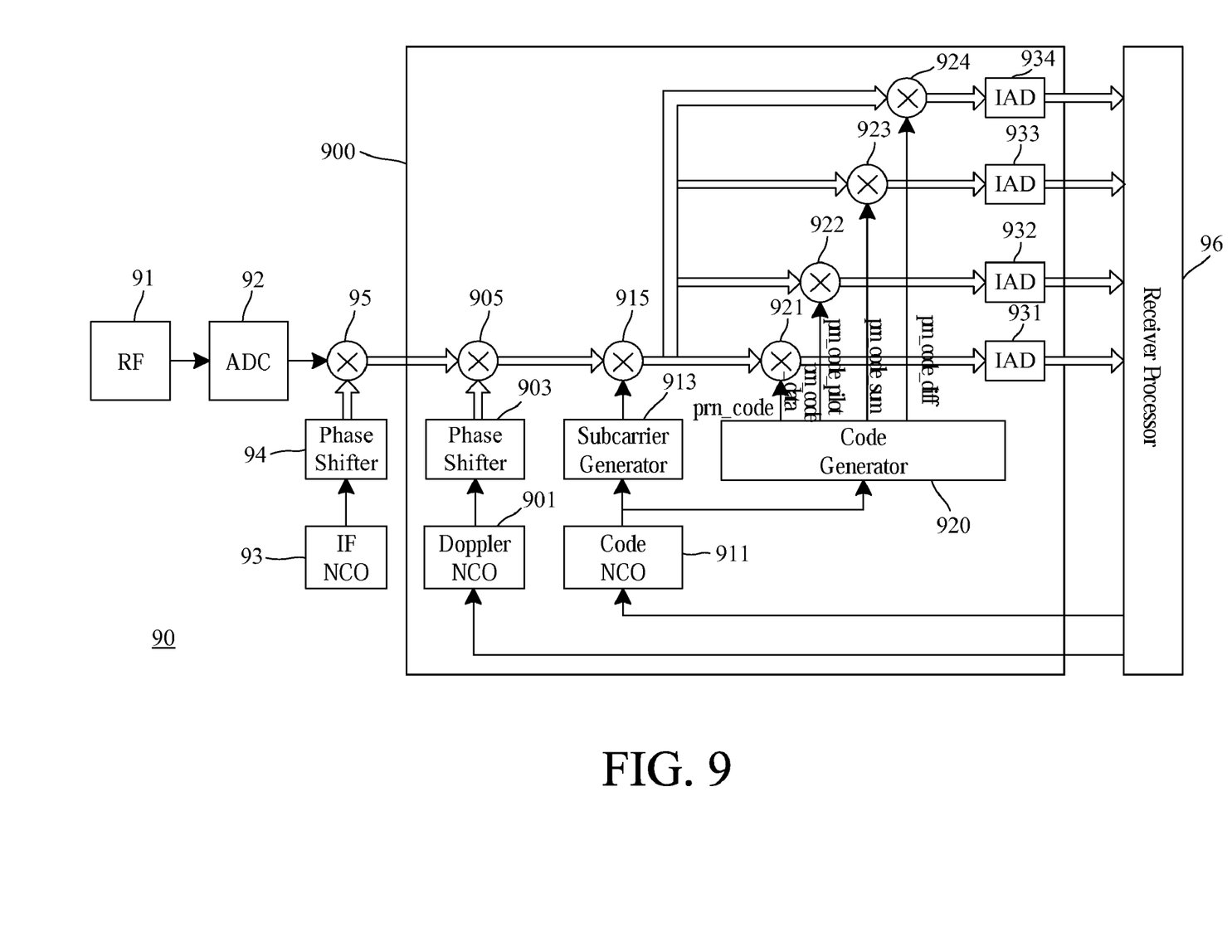
FIG. 9 is a block diagram schematically and generally showing a GNSS receiver having a correlator in accordance with a sixth embodiment of the present invention.

FIG. 9 is a block diagram schematically and generally showing a GNSS receiver 90 in accordance with a sixth embodiment of the present invention. As can be seen from this drawing, the structure of the receiver 90 is similar to the receiver 10 in FIG. 1. Again, the like reference numbers indicate the same elements. In the present embodiment, the receiver 90 has a correlator 900, in which a code generator 920 outputs a plurality of prn_code signals such as prn_code_data, prn_code_pilot, prn_code_sum, and prn_code_diff as described above in parallel. Accordingly, there are four mixers 921 to 924 and four IAD 931 to 934 for respectively correlating the prn_code signals with the received signal.

Figure 10:
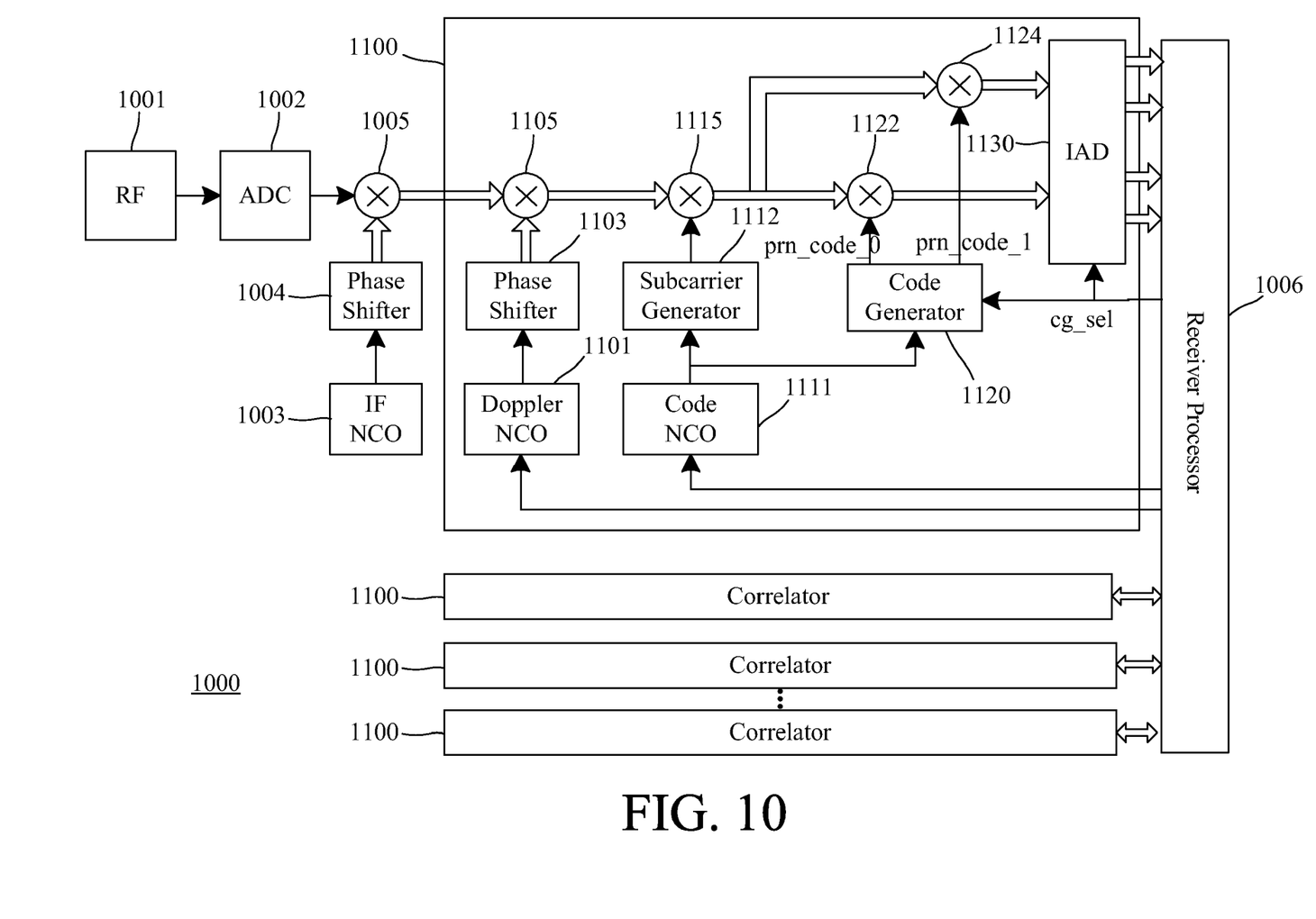
FIG. 10 is a block diagram schematically and generally showing a GNSS receiver having a correlator in accordance with a seventh embodiment of the present invention.

FIG. 10 is a block diagram schematically and generally showing a GNSS receiver 1000 in accordance with a seventh embodiment of the present invention. As can be seen from this drawing, the structure of the receiver 1000 is similar to the receiver 80 in FIG. 8. The like reference numbers indicate the same elements. In the present embodiment, the receiver 1000 has a plurality of correlators 1100. As can be seen from the drawings, the structure of each correlator 1100 is similar to that of correlator 200 shown in FIG. 2. The difference is that the correlator 1100 has a single IAD 1130 rather than two IADs. The IAD 1130 is controlled by a control signal cg_sel, which is also used to control a code generator 1120, so as to operate at a double speed as compared to IAD 232 or 234 in FIG. 2. That is, the IAD 1130 speeds up by a speed factor of 2 in this example. The code generator 1120, which can be implemented by the correlator 720 shown in FIG. 7, outputs two prn_code signals, prn_code_0 and prn_code 1, each time. The prn_code signals are selected from the prn_code_data, prn_code_pilot, prn_code_sum, prn_code_diff and so on as described above. The two prn_code signals are mixed with a received signal by mixers 1122, 1124 and fed to the IAD 1130 operating at double speed. Therefore, there are four parallel correlations being calculated each round.

Figure 11:
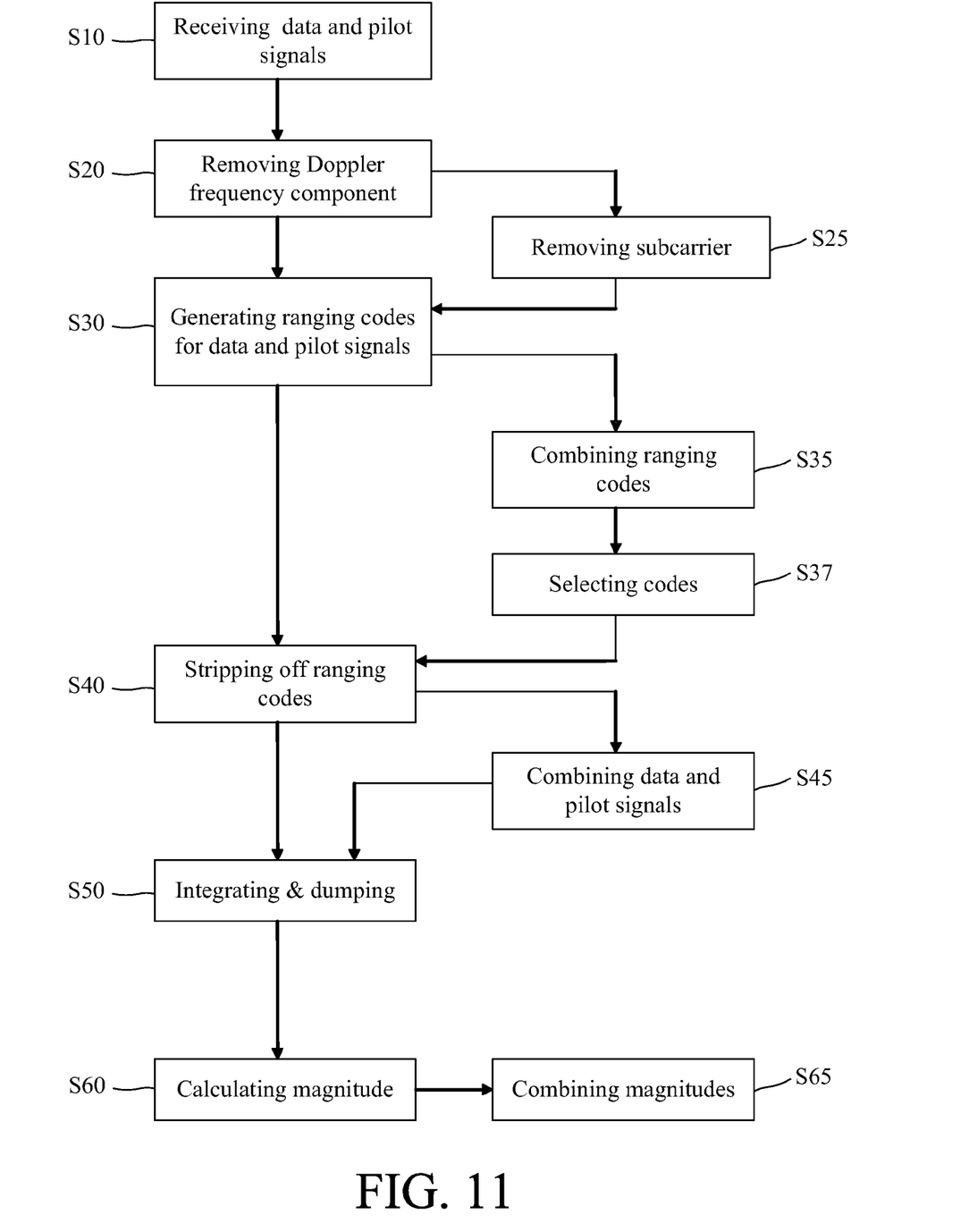
FIG. 11 is a flow chart showing a correlation method in accordance with the present invention.

The various cases of a correlation method in accordance with the present invention can be generalized as a flow chart as shown in FIG. 11. In step S10, data and pilot signals of the satellite are received. In step S20, Doppler frequency components of the signals are removed. If the signal has subcarrier, the subcarrier is removed in step S25 in this example. As mentioned, the subcarrier can be removed at any proper stage. In step S30, ranging codes are generated for the data and pilot signals. In one case, the process goes to step S40 directly to strip off the ranging codes of the signals. In another case, the ranging codes are combined in advance into various codes as described in the above embodiments (step S35) and proper ones of the codes are selected (step S37). The signal stripped off the ranging code is integrated and dumped in step S50. In the case that the ranging codes of the data and pilot signals are directly stripped off without processing the codes, the data and pilot signals stripped off the ranging codes can be combined in step S45 and then are integrated and dumped to calculate the correlation results (step S50). Then magnitude of the correlation result is calculated in step S60. In non-coherent combining case, correlation results of the data and pilot signals are respectively calculated and the magnitudes are combined in step S65.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A correlator of a GNSS (Global Navigation Satellite System) receiver, each satellite transmitting a data signal and a pilot signal in the GNSS, said correlator comprising:
    a Doppler frequency removal unit for removing Doppler frequency component of a received signal;
    a code generator controlled by symbols of the data signal and pilot signal to generate ranging codes for the data signal and pilot signal; and
    an integration and dump unit for integrating and dumping the received signal being removed Doppler frequency and stripped off ranging code by using the ranging code output from the code generator to obtain correlation result thereof.

2. The correlator as claimed in claim 1, wherein the code generator outputs the generated codes in a time division multiplexing scheme.

3. The correlator as claimed in claim 1, wherein the code generator outputs a plurality of the generated codes simultaneously.

4. The correlator as claimed in claim 1, wherein the code generator comprises a data code generator for generating the ranging code for the data signal and a pilot code generator for generating the ranging code for the pilot signal.

5. The correlator as claimed in claim 4, further comprising an adder for combining the data and pilot signals of which the ranging codes have been stripped off by using the ranging codes output from the code generator.

6. The correlator as claimed in claim 4, wherein the code generator further generates a code which is a sum of the ranging codes for the data and pilot signals.

7. The correlator as claimed in claim 4, wherein the code generator further generates a code which is an inverse of the sum of the ranging codes for the data and pilot signals.

8. The correlator as claimed in claim 4, wherein the code generator further generates a code which is a difference of the ranging codes for the data and pilot signals.

9. The correlator as claimed in claim 4, wherein the code generator further generates a code which is an inverse of the difference of the ranging codes for the data and pilot signals.

10. The correlator as claimed in claim 1, wherein the code generator generates the ranging codes for the data and pilot signals and combinations thereof.

11. The correlator as claimed in claim 10, wherein the code generator has a multiplexer being controlled to output one or more codes selected from the ranging codes and the combinations thereof.

12. The correlator as claimed in claim 1, wherein the integration and dump unit comprises first and second units for respectively calculating correlation results for the data and pilot signals.

13. The correlator as claimed in claim 10, further comprising magnitude units for calculating magnitudes of the correlation results for the data and pilot signals, and an adder for summing the calculated magnitudes.

14. The correlator as claimed in claim 1, wherein the integration and dump unit speeds up by a speed factor to generate a plurality of correlation results in parallel.

15. The correlator as claimed in claim 1, further comprising a subcarrier removal unit for removing subcarrier of the received signal.

16. A code generator used in a correlator processing a data signal and pilot signal from a satellite, the code generator comprising:
    a data code generator for generating a ranging code for the data signal;
    a pilot code generator for generating a ranging code for the pilot signal;
    a first adder for generating a sum of the ranging codes for the data and pilot signals; and
    a second adder for generating a difference of the ranging codes for the data and pilot signal.

17. The code generator as claimed in claim 16, further comprising a multiplexer being controlled to output one or more codes selected from the ranging codes for the data and pilot signals as well as the sum and difference thereof.

18. The code generator as claimed in claim 17, wherein the multiplexer is controlled by symbols of the data and pilot signals.

19. The code generator as claimed in claim 16, further comprising first and second inverters for inverting the sum and difference of the ranging codes for the data and pilot signals, respectively.

20. A correlation method of a GNSS (Global Navigation Satellite System) receiver, each satellite in the GNSS transmitting a data signal and a pilot signal, said correlation method comprising:
    removing Doppler frequency component of a received signal;
    generating ranging codes for the data signal and pilot signal by symbols of the data signal and pilot signal;
    stripping off the ranging codes from the data and pilot signals by using the ranging codes; and
    integrating and dumping the received signal being removed Doppler frequency and stripped off ranging code to obtain correlation result thereof.

21. The method as claimed in claim 20, wherein the ranging codes are provided in a time division multiplexing scheme.

22. The method as claimed in claim 20, wherein the ranging codes are provided simultaneously.

23. The method as claimed in claim 20, further comprising combining the data and pilot signals of which the ranging codes have been stripped off.

24. The method as claimed in claim 20, further comprising calculating magnitudes of the correlation results for the data and pilot signals, and summing the calculated magnitudes.

* * * * *